(12) United States Patent
Lee et al.

(10) Patent No.: US 10,528,195 B2
(45) Date of Patent: Jan. 7, 2020

(54) TOUCH DEVICE, WEARABLE DEVICE HAVING THE SAME AND TOUCH RECOGNITION METHOD

(71) Applicant: LG INNOTEK CO., LTD., Seoul (KR)

(72) Inventors: Tae Jin Lee, Seoul (KR); Sang Young Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 285 days.

(21) Appl. No.: 15/307,751

(22) PCT Filed: Apr. 29, 2015

(86) PCT No.: PCT/KR2015/004346
§ 371 (c)(1),
(2) Date: Oct. 28, 2016

(87) PCT Pub. No.: WO2015/167260
PCT Pub. Date: Nov. 5, 2015

(65) Prior Publication Data
US 2017/0052618 A1  Feb. 23, 2017

(30) Foreign Application Priority Data

Apr. 30, 2014  (KR) .................. 10-2014-0052936
Apr. 30, 2014  (KR) .................. 10-2014-0052939
May 14, 2014  (KR) .................. 10-2014-0058081

(51) Int. Cl.
| | |
|---|---|
| *G06F 3/044* | (2006.01) |
| *G06F 3/041* | (2006.01) |
| *G06F 3/01* | (2006.01) |
| *G09G 5/00* | (2006.01) |

(52) U.S. Cl.
CPC .............. *G06F 3/044* (2013.01); *G06F 3/017* (2013.01); *G06F 3/041* (2013.01); *G09G 5/006* (2013.01); *G06F 2203/04101* (2013.01); *G09G 2370/16* (2013.01)

(58) Field of Classification Search
None
See application file for complete search history.

(56) References Cited

U.S. PATENT DOCUMENTS 6,611,372 B1 *  8/2003  Peyghambarian ........ C03C 3/17
                                                    359/341.1
8,536,588 B2 *  9/2013  Takahashi ............ C09K 11/574
                                                    257/88
(Continued)

FOREIGN PATENT DOCUMENTS

| CN | 101963840 | 2/2011 |
|---|---|---|
| JP | 2012-088294 | 5/2012 |

(Continued)

OTHER PUBLICATIONS

English language translation of Yanagisawa, JP-2012-088294 (Year: 2012).*

(Continued)

*Primary Examiner* — Dorothy Harris
(74) *Attorney, Agent, or Firm* — Ked & Associates, LLP

(57) ABSTRACT

Disclosed is a touch device including a display to display a screen image, and a radar system under the display to detect a touch.

8 Claims, 11 Drawing Sheets

(56) References Cited

U.S. PATENT DOCUMENTS

| | | | |
|---|---|---|---|
| 2006/0040739 A1* | 2/2006 | Wells | G01S 13/34 463/37 |
| 2009/0002931 A1* | 1/2009 | Iijima | G06F 1/1601 361/679.27 |
| 2009/0096652 A1* | 4/2009 | Houng | H03M 1/002 341/155 |
| 2009/0295760 A1* | 12/2009 | Linge | G06F 3/0412 345/179 |
| 2010/0039379 A1* | 2/2010 | Hildreth | G06F 3/0418 345/156 |
| 2010/0277251 A1* | 11/2010 | Kondo | H03B 1/02 331/158 |
| 2011/0063224 A1 | 3/2011 | Vexo et al. | |
| 2011/0069023 A1* | 3/2011 | Kwak | G06F 3/041 345/173 |
| 2011/0193818 A1* | 8/2011 | Chen | G06F 3/041 345/174 |
| 2012/0062514 A1 | 3/2012 | Yu | |
| 2012/0075233 A1* | 3/2012 | Lakshminarayanan | G06F 1/1601 345/174 |
| 2012/0086647 A1* | 4/2012 | Birkler | G06F 1/3203 345/173 |
| 2012/0092284 A1* | 4/2012 | Rofougaran | G06F 3/017 345/173 |
| 2012/0133597 A1* | 5/2012 | Chen | G06F 3/044 345/173 |
| 2012/0280900 A1* | 11/2012 | Wang | G06F 3/0488 345/156 |
| 2012/0313895 A1 | 12/2012 | Haroun et al. | |
| 2013/0094126 A1* | 4/2013 | Rappoport | G02B 27/01 361/679.01 |
| 2013/0111360 A1* | 5/2013 | Kodama | G06F 3/0488 715/753 |
| 2013/0162517 A1* | 6/2013 | Gay | G06F 3/046 345/156 |
| 2013/0196716 A1* | 8/2013 | Muhammad | G06F 3/046 455/566 |
| 2013/0207936 A1* | 8/2013 | Theimer | G06F 3/0488 345/175 |
| 2013/0222347 A1* | 8/2013 | Riedel | B64D 45/00 345/175 |
| 2013/0271399 A1* | 10/2013 | Liu | G06F 3/041 345/173 |
| 2013/0293489 A1* | 11/2013 | Shin | G06F 3/041 345/173 |
| 2015/0135078 A1* | 5/2015 | Erkkila | G06F 1/163 715/727 |

FOREIGN PATENT DOCUMENTS

| | | |
|---|---|---|
| JP | 2012088294 A * | 5/2012 |
| KR | 10-2009-0117302 | 11/2009 |
| KR | 10-2011-0035390 | 4/2011 |
| KR | 10-2011-0089892 | 8/2011 |
| KR | 10-2013-0045222 | 5/2013 |
| KR | 10-1300534 | 9/2013 |

OTHER PUBLICATIONS

International Search Report and Written Opinion dated Jul. 20, 2015 issued in Application No. PCT/KR2015/004346 (Full English Text).
Chinese Office Action dated Sep. 4, 2018 issued in Application 201580021715.8 (full Chinese text).

* cited by examiner

[Fig. 1]
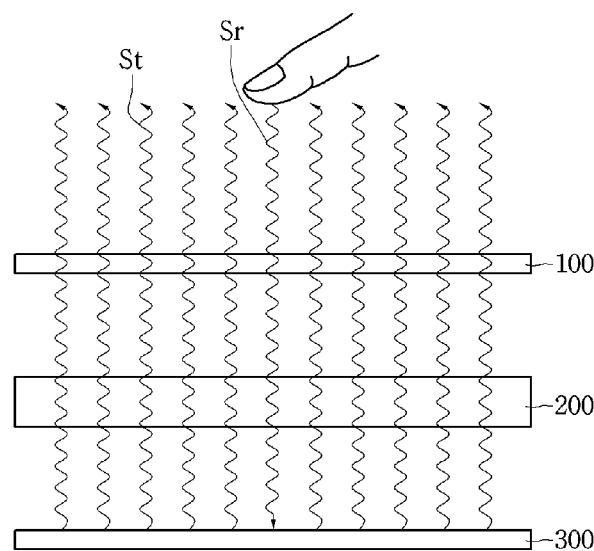
[Fig. 2]
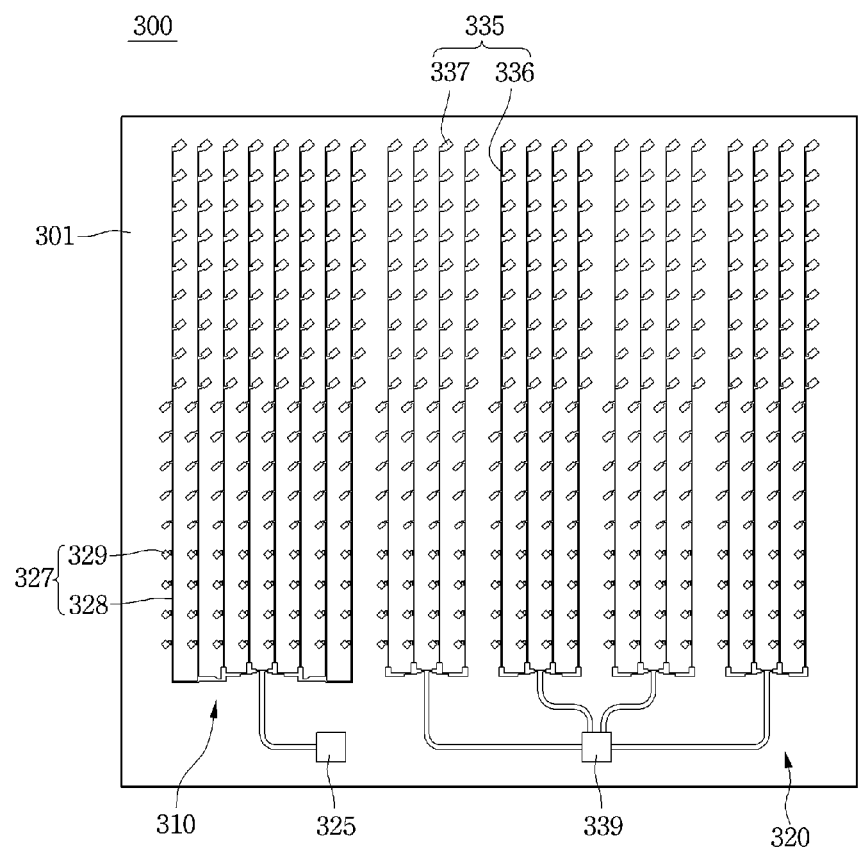

[Fig. 3]
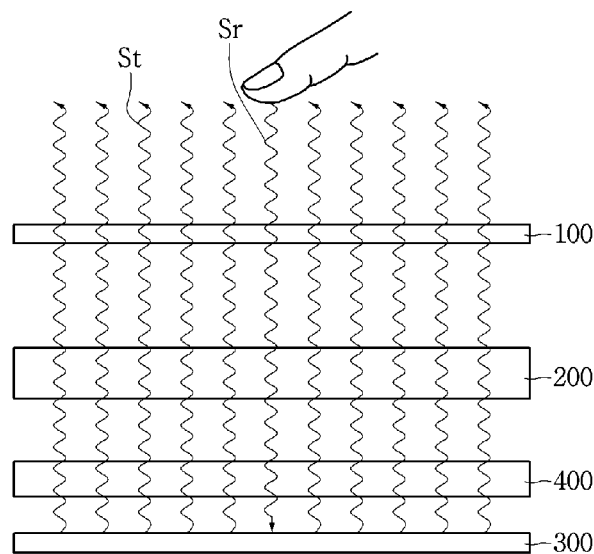
[Fig. 4]
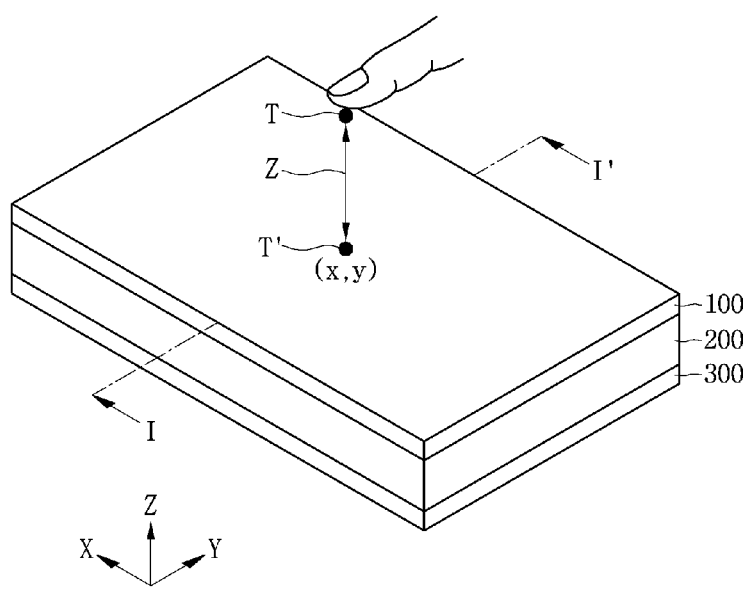
[Fig. 5]
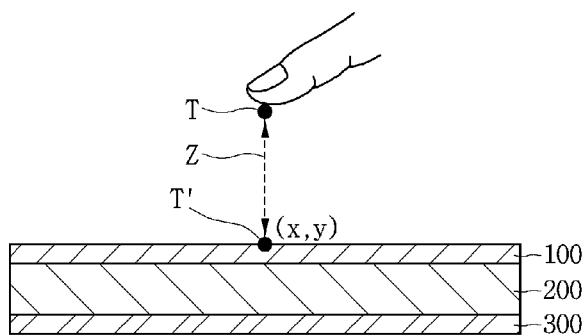

[Fig. 6]
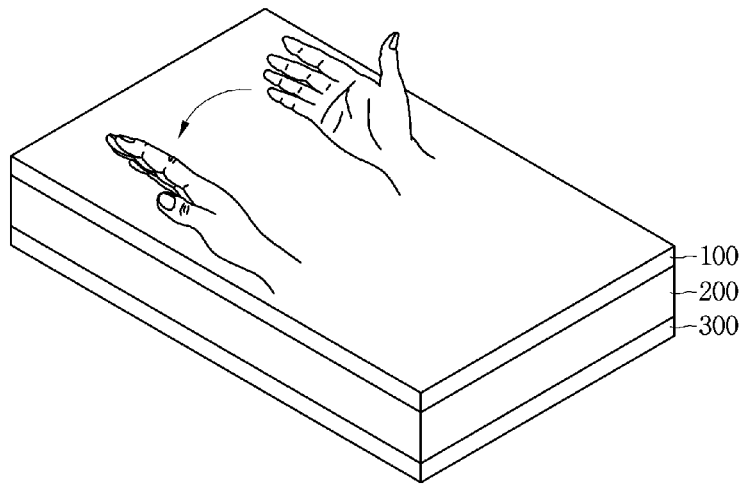
[Fig. 7]
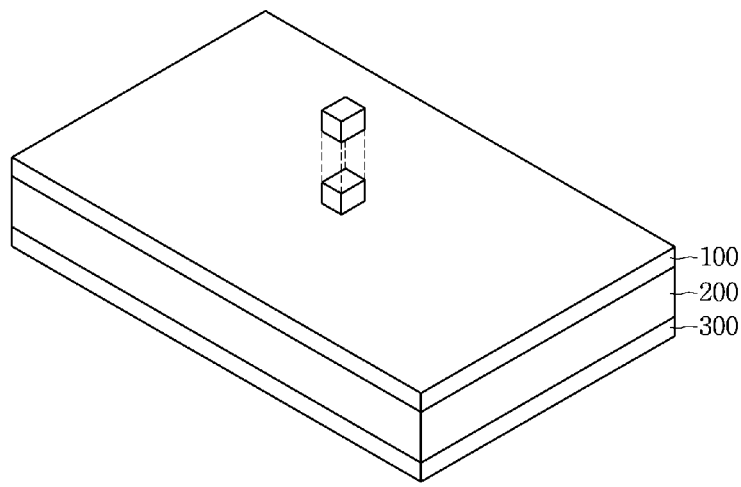
[Fig. 8]
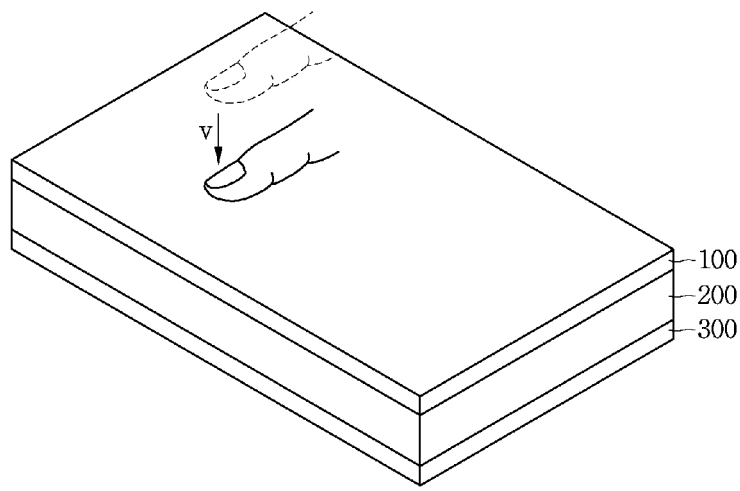

[Fig. 9]
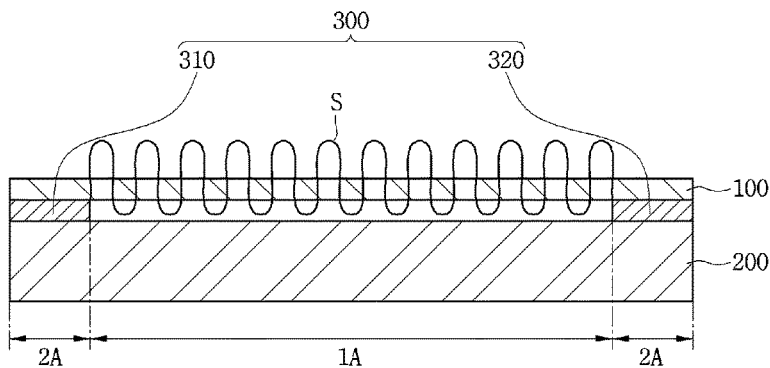
[Fig. 10]
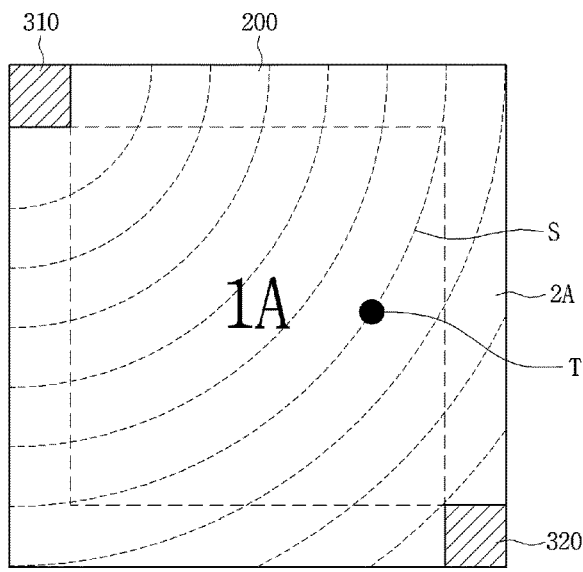
[Fig. 11]
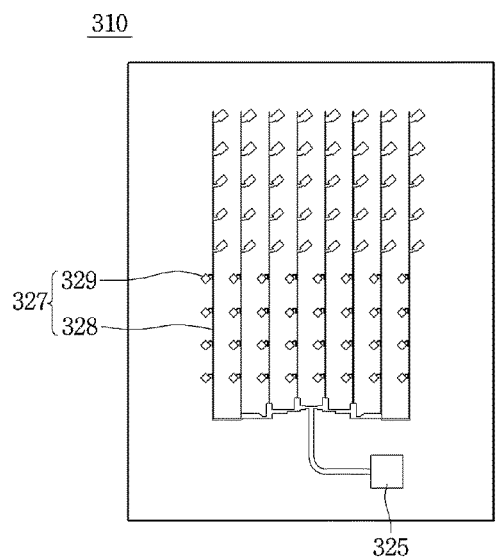

[Fig. 12]
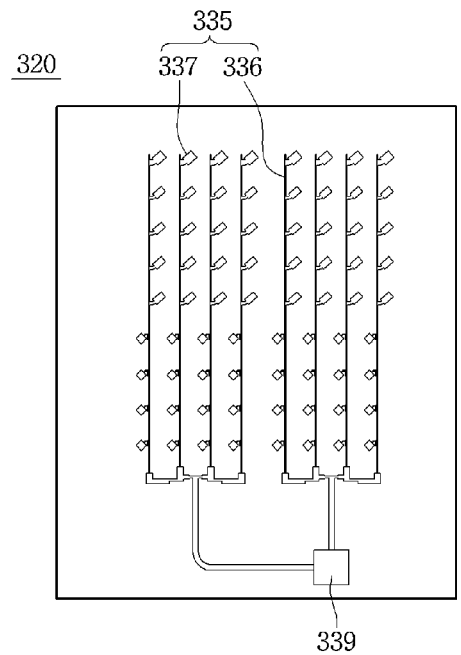
[Fig. 13]
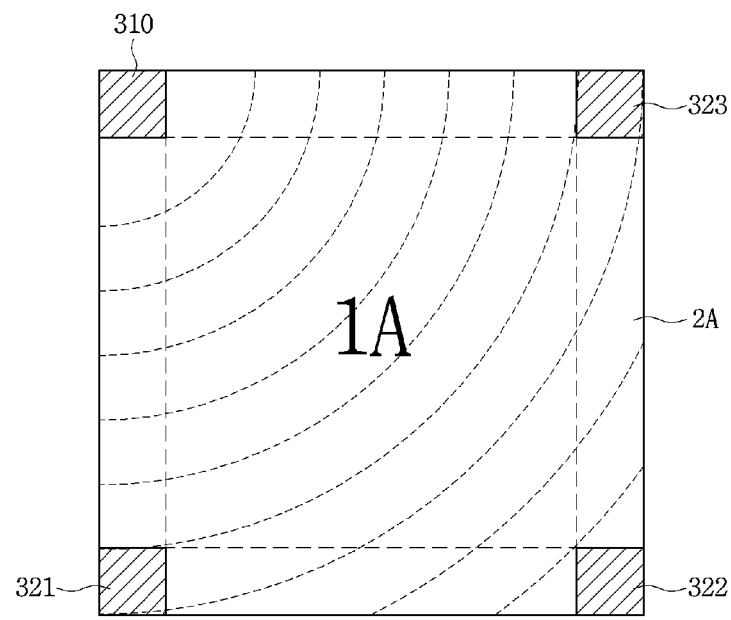

[Fig. 14]
310
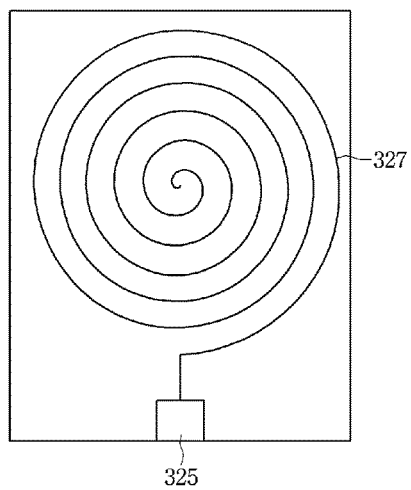
[Fig. 15]
320
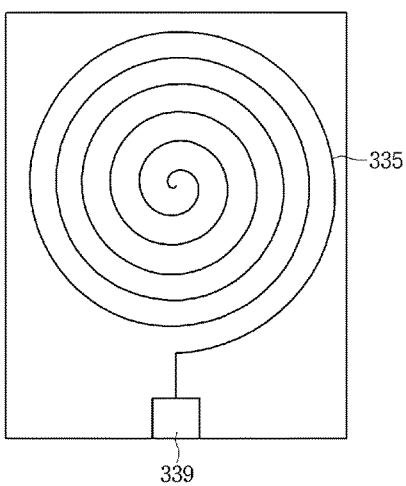
[Fig. 16]
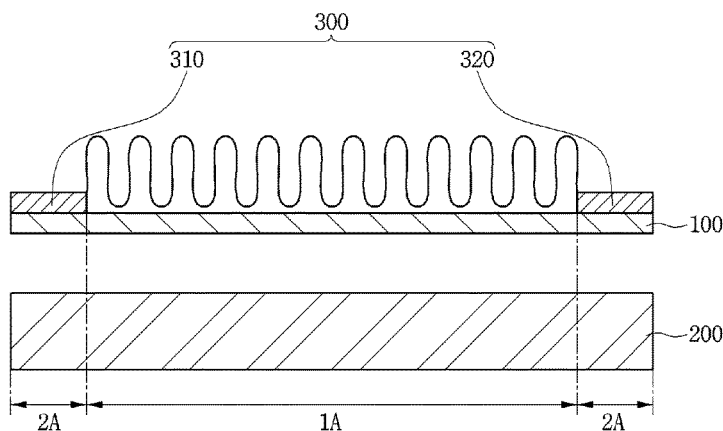

[Fig. 17]
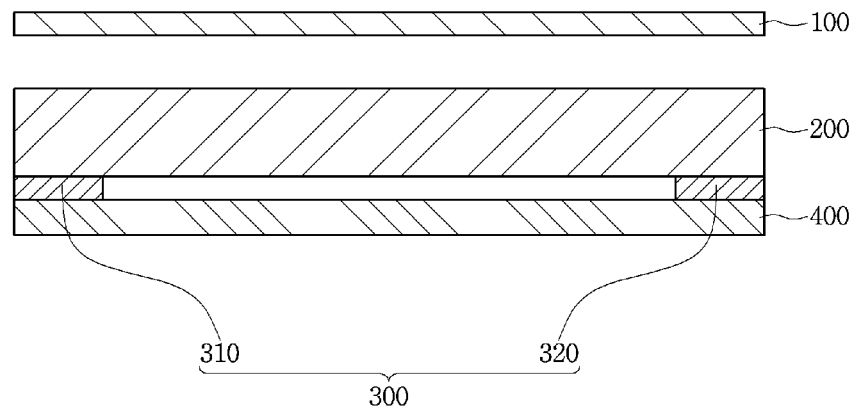
[Fig. 18]
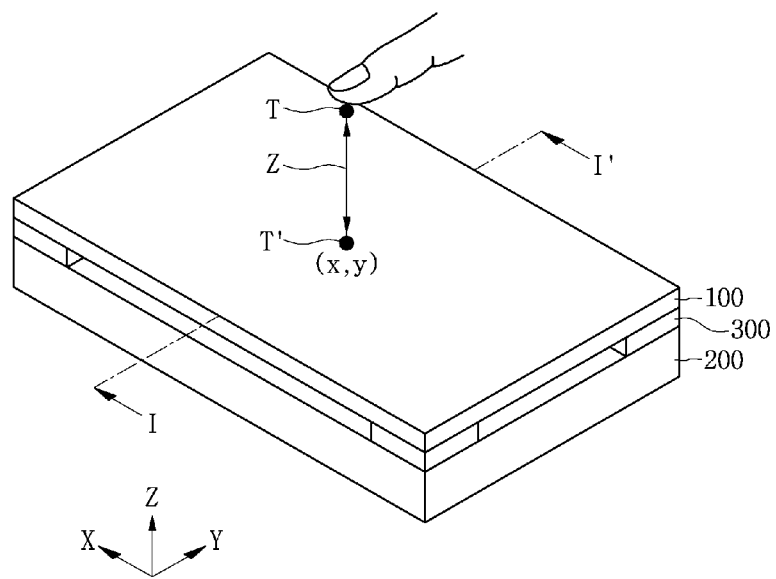
[Fig. 19]
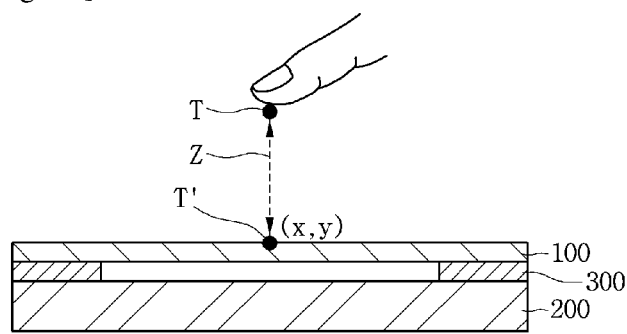

[Fig. 20]
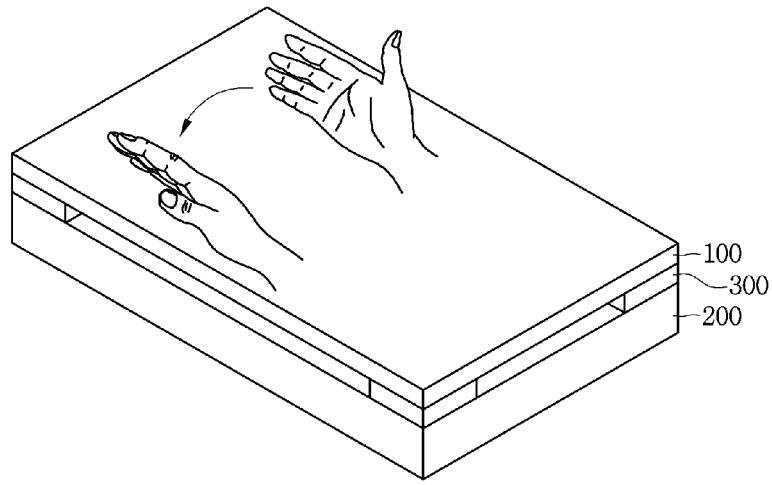
[Fig. 21]
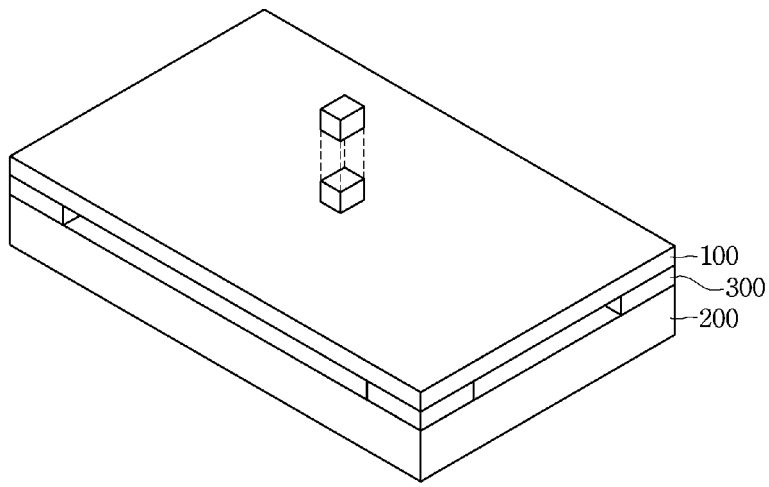
[Fig. 22]
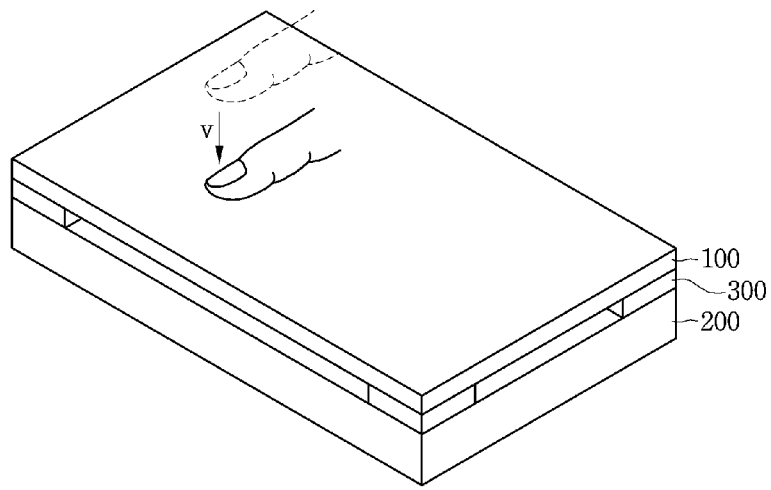

[Fig. 23]
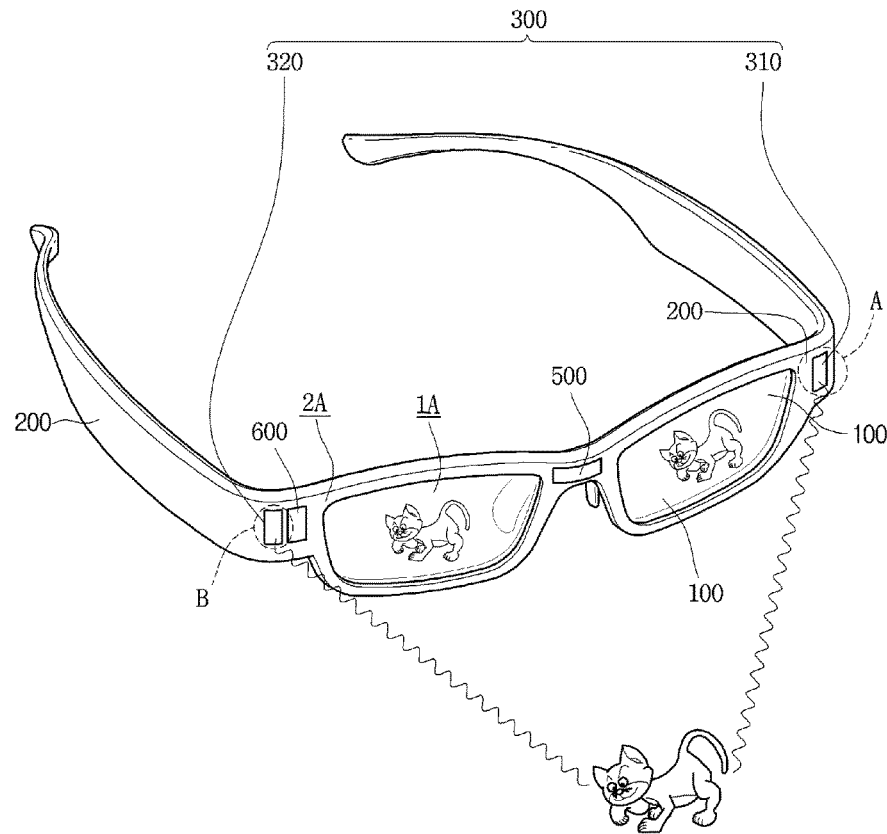
[Fig. 24]
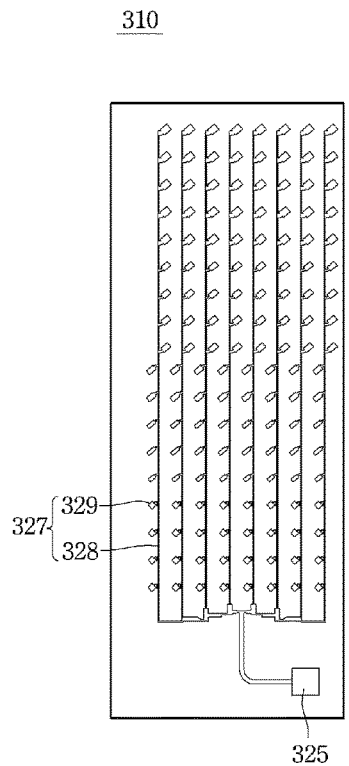

[Fig. 25]
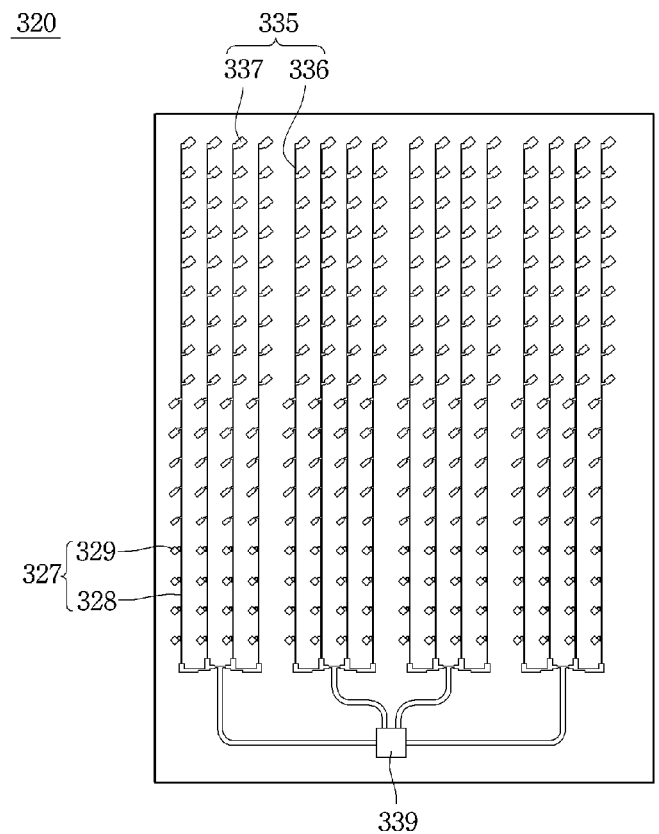
[Fig. 26]
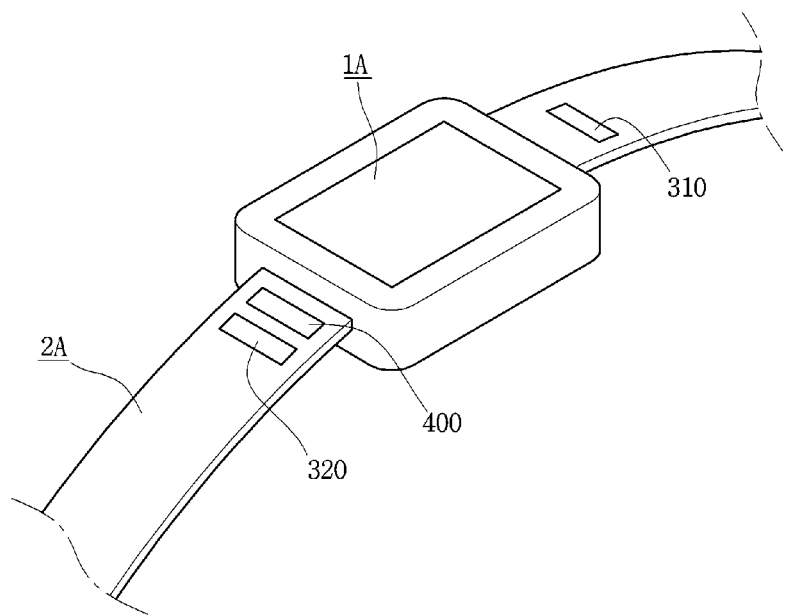

[Fig. 27]
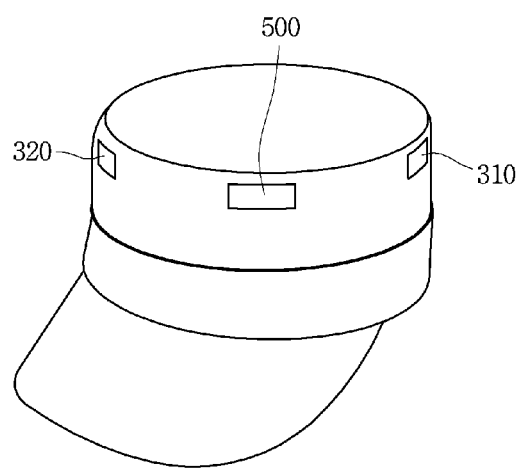

TOUCH DEVICE, WEARABLE DEVICE HAVING THE SAME AND TOUCH RECOGNITION METHOD

CROSS-REFERENCE TO RELATED PATENT APPLICATIONS

This application is a U.S. National Stage Application under 35 U.S.C. § 371 of PCT Application No. PCT/KR2015/004346, filed Apr. 29, 2015, which claims priority to Korean Patent Application No. 10-2014-0052936, filed Apr. 30, 2014, Korean Patent Application No. 10-2014-0052939, filed Apr. 30, 2014, and Korean Patent Application No. 10-2014-0058081, filed May 14, 2014, whose entire disclosures are hereby incorporated by reference.

TECHNICAL FIELD

The disclosure relates to a touch device, a wearable device having the same, and a method of recognizing a touch.

BACKGROUND ART

Recently, a touch panel, which performs an input function through the touch of an image displayed on a display by an input device such as a finger or a stylus pen, has been applied to various electronic appliances.

A scheme to sense a touch position may representatively include a capacitive touch scheme and a resistive touch scheme. In a touch panel employing the resistive touch scheme, the touch position is detected by detecting the variation of resistance resulting from the connection between electrodes when pressure is applied to the input device. In a touch panel employing the capacitive touch scheme, the touch position is detected by detecting the variation in capacitance between electrodes when a finger of the user is touched on the touch panel. When taking into consideration the convenience of a fabrication scheme and a sensing power, the capacitive touch scheme has been spotlighted in a smaller model touch panel recently.

Meanwhile, recently, in addition to the above scheme, there is required a position detecting scheme for more accurately and simply recognizing a position.

In particular, the demand for a wearable device, such as a smart watch or smart glasses, which can be directly worn by a user, is increased. Accordingly, a new function and a differentiated user interface are required for the wearable device.

DISCLOSURE OF INVENTION

Technical Problem

The embodiment provides a touch device having a novel structure, a wearable device having the same, and a touch recognition method.

Solution to Problem

According to the embodiment, there is provided a touch device including a display to display a screen image, and a radar system provided under the display to detect a touch.

According to the embodiment, there is provided a touch recognition method including transmitting a signal on a touch device, receiving the signal reflected by a touch, and recognizing the touch by analyzing the signal. The transmitting of the signal includes transmitting a radar signal, and the receiving of the signal comprises receiving the radar signal.

According to the embodiment, there is provided a wearable device including a first area to display a screen image, and a second area adjacent to the first area. The second area includes a radar system including a transmission unit to transmit a signal and a reception unit to receive the signal. The transmission unit includes a transmission device to generate the radar signal and a transmission antenna to transmit the radar signal, and the reception unit includes a reception antenna to receive the radar signal and a reception device to generate reception data based on the radar signal.

Advantageous Effects of Invention

As described above, the touch can be recognized using the radar system according to the embodiment. Accordingly, reflected signal by various types of touches can be accurately recognized. In other words, the distance between the touch device and the touch point and the position related to the coordinates of the touch point can be recognized from the reflected signal by the touch and the reception data. In other words, the touch device can recognize not only the direct touch on the top surface of the touch device, but also the touch in the space at the predetermined distance from the touch device. In addition, when the touch is provided in the form of a gesture or a motion, the touch device can recognize the touch. In addition, the 3D shape of the object making the touch can be recognized. In addition, the touch velocity can be recognized. Accordingly, the differentiated user interface can be provided, and the user experience can be expanded.

According to the embodiment, since the touch is recognized by the radar system, the touch device is not affected by the external electrical noise. In other words, according to the embodiment, since the touch is recognized through a scheme different from a scheme of recognizing a touch using an electrical field based on a capacitive touch scheme, the touch device is not affected by the electrical field.

Meanwhile, the radar signal has a characteristic that wavelengths thereof are spread. Accordingly, an area to sense the touch can be enlarged on the touch device, and a dead zone does not exist on the touch device. In other words, although a Bezel is included in a touch device according to the related art, so that a touch cannot be recognized in the Bezel, the touch can be recognized using the radar system according to the embodiment, so that the touch can be sensed in all areas including the Bezel.

In addition, according to the embodiment, objects having various shapes can be precisely recognized through the radar system. In other words, the distance between the touch device and the object and the position related to the coordinates of the object can be recognized from the reflected signal by the object and the reception data. In addition, the 3D shape of the object can be recognized. In addition, the velocity of the object can be recognized.

In addition, the device according to the embodiment converts the reception data into the voice data to be provided for a user. Accordingly, the device according to the embodiment can be used for the blind.

Meanwhile, after generating an image signal for augmented reality using the reflected signal of the radar system according to the embodiment, the image signal is applied to the project module to realize the augmented reality. Accordingly, the weight and the volume of the device can be reduced, so that various types of wearable devices can be employed.

In addition, the device according to another embodiment can be directly worn by the user to realize augmented reality. Therefore, the differentiated user interface can be provided, and the user experience can be expanded.

BRIEF DESCRIPTION OF DRAWINGS

FIG. 1 is a perspective view showing a touch device according to the embodiment.

FIG. 2 is a plan view showing an antenna system including a touch device according to the embodiment.

FIG. 3 is a view showing a touch device according to another embodiment.

FIGS. 4 to 8 are views to explain a touch recognition method of the touch device according to the embodiment.

FIG. 9 is a sectional view showing a touch device according to still another embodiment.

FIG. 10 is a plan view showing the touch device of FIG. 9.

FIGS. 11 and 12 are plan views showing an antenna system included in the touch device of FIG. 9

FIG. 13 is a plan view showing a touch device according to still another embodiment.

FIGS. 14 and 15 are plan views showing an antenna system included in the touch device according to still another embodiment.

FIGS. 16 and 17 are sectional views showing the touch device according to still another embodiment.

FIGS. 18 to 22 are sectional views to explain a touch recognition method of the touch device according to another embodiment.

FIG. 23 is a view showing one example of a wearable device including the touch device according to the embodiment.

FIG. 24 is an enlarged view showing a part A of FIG. 23.

FIG. 25 is an enlarged view showing a part B of FIG. 23.

FIGS. 26 and 27 are perspective views showing a wearable device according to another embodiment.

MODE FOR THE INVENTION

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer (or film), each region, each pattern, or each structure shown in the drawings may be modified for the purpose of convenience or clarity of the explanation. In addition, the size of elements does not utterly reflect an actual size.

Hereinafter, the embodiment of the disclosure will be described in detail with reference to accompanying drawings.

Referring to FIG. 1, a touch device according to the embodiment may include a cover 100, a display 200, and a radar system 300.

The cover 100 may be provided on the display 200. The cover 100 may protect the display 200 from an external environment.

The cover 100 may include glass or plastic.

For example, the cover 100 may include chemically tempered/semi-tempered glass, such as soda lime glass or aluminosilicate glass, may include reinforced plastic or flexible plastic, such as polyimide (PI), polyethylene terephthalate (PET), propylene glycol (PPG) or polycarbonate (PC), or may include sapphire.

The cover 100 may include an optical isotropic film. For example, the cover 100 may include cyclic olefin copolymer (COC), cyclic olefin polymer (COP), an optical isotropic polycarbonate (PC), or an optical isotropic polymethylmethacrylate (PMMA).

The sapphire has superior electric characteristics, such as permittivity, so that a touch response speed may be greatly increased and a space touch such as hovering may be easily implemented, and has a high surface hardness.

The display 200 has a display area to output an image. The display 200 applied to the touch device may generally include upper and lower substrates. The lower substrate may be provided thereon with a data line, a gate line, and a thin film transistor (TFT). The upper substrate may be bonded to the lower substrate to protect components provided on the lower substrate.

The display 200 may include various types of displays depending on types of the touch device according to the embodiment. In other words, the touch device according to the embodiment may include a liquid crystal display (LCD), a field emission display device (FED), a plasma display panel device (PDP), an organic light emitting display device (OLED) and an electrophoretic display (EPD). Accordingly, the display 200 may include various types of displays.

The radar system 300 may be provided under the display 200. The radar system 300 may be provided on a rear surface of the display 200. In other words, the radar system 300 may be provided on a surface opposite to a surface on which a screen image of the display 200. Accordingly, the blocking of the screen image of the display 200 or the interruption in the visibility of the screen image by the radar system 300 can be prevented.

The radar system 300 may recognize the touch on the touch device. The radar system 300 may detect the touch on the touch device using an electromagnetic wave. In this case, the radar system 300 transmits a radar signal in the form of an electromagnetic wave. In this case, the radar signal is reflected from an input device or an object touched on the touch device and introduced into the touch device.

The radar system 300 includes a substrate 301, a radar transmission unit 310, and a radar reception unit 320. The radar system 300 may be realized as shown in FIG. 2.

The substrate 301 supports the radar transmission unit 310 and the radar reception unit 320 in the radar system 300. In this case, the substrate 310 may have a flat panel structure. In addition, the substrate 301 may have a multi-layer structure. In addition, the substrate 310 may be formed therein with at least one groove (not shown). In addition, the groove may be formed in an upper portion of the substrate 301.

The radar transmission unit 310 transmits a radar signal (St) in the radar system 300. In this case, the radar transmission unit 310 transmits the radar signal (St) through one transmission channel. In addition, the radar transmission unit 310 periodically transmits the radar signal (St). The radar transmission unit 310 includes a transmission device 325 and a transmission antenna 327.

In this case, the radar transmission unit 310 may transmit the radar signal (St) at a frequency band in the range of 1 GHz to 15 GHz. Accordingly, the touch device can recognize not only a direct touch on the top surface of the touch device, but also a space touch at a predetermined distance from the touch device.

The transmission device 325 generates a radar signal from transmission data. In this case, the transmission device 325 generates a radar signal corresponding to the transmission channel. The transmission device 325 includes an oscillation unit. For example, the oscillation unit includes a voltage controlled oscillator (VCO). In this case, the transmission device 325 may be inserted into the groove of the substrate 301.

The transmission antenna 327 transmits the radar signal (St) into the air. The transmission antenna 327 transmits the radar signal (St) onto the display 200. The transmission antenna 327 transmits the radar signal (St) to an upper portion of the touch device. In this case, the transmission antenna 327 transmits the radar signal (St) through the transmission channel. The transmission antenna 327 includes a feeding unit 328 and a plurality of radiators 329. The feeding unit 328 is connected to the transmission device 325. In addition, the feeding unit 328 transmits the radar signal to the radiators 329. The radiators 329 are distributed and arranged in the feeding unit 328. In addition, the radiators 329 actually transmit the radar signal.

The radar reception unit 320 receives a radar signal in the radar system 300. In this case, the radar reception unit 320 receives the radar signal through a plurality of reception channels. The radar reception unit 320 includes a plurality of reception antennas 335 and a plurality of reception devices 339. In this case, the reception channels are allocated to the reception antennas 335, respectively, and the reception antennas 335 individually correspond to the reception devices 339, respectively.

The reception antennas 335 receive a radar signal (Sr) from the air. The reception antennas 335 receive the radar signal (Sr) from the upper portion of the display 200. The reception antennas 335 receive the radar signal (Sr) from the upper portion of the touch device. When the touch is made on the touch device, the reception antennas 335 receive the radar signal (Sr) reflected by the touch. In this case, the reception antennas 335 receive the radar signal (Sr) through the reception channels. In other words, the reception antennas 335 receive the radar signal through the reception channels, respectively. In addition, the reception antennas 335 transmit the radar signal to the reception devices 339. Each of the reception antennas 335 includes a feeding unit 336 and a plurality of radiators 337. The feeding unit 336 is connected with the relevant reception device 339. The radiators 337 are distributed and arranged in the feeding unit 336. In addition, the radiators 337 actually receive the radar signal. Thereafter, the radiators 337 transmit the radar signal to the feeding unit 336.

The relevant reception devices 339 generate reception data from the radar signal (Sr). In this case, the reception devices 339 generate reception data corresponding to the reception channels. In other words, the reception devices 339 generate the reception data corresponding to the reception channels, respectively. The touch of the touch device can be recognized by analyzing the reception data.

The number of the radar reception units 320 may be larger than the number of the radar transmission units 310. In detail, the number of the reception antennas 335 may be larger than the number of transmission antennas 327. Accordingly, the reflected signal (Sr) for various types of touches can be accurately recognized. In other words, the distance between the touch device and a touch point and a position related to the coordinates of the touch point can be recognized from the reflected signal (Sr) by the touch and the reception data. In addition, when the touch is made in the form of a gesture or a motion, the touch device can recognize the touch. In addition, the touch device can recognize a 3D shape of an object making the touch.

Meanwhile, the transmission antenna 327 and the reception antenna 335 extend along one side of the substrate 301, and the radar signal (Sr) has a characteristic that wavelengths thereof are spread. Accordingly, an area to sense the touch can be enlarged on the touch device, and a dead zone does not exist on the touch device. In other words, although a Bezel is provided in a touch device according to the related art, so that a touch cannot be recognized in the Bezel, the touch can be recognized using the radar system according to the embodiment, so that the touch can be sensed in all areas including the Bezel.

Meanwhile, the transmission antenna 327 and the reception antenna 335 may be alternately formed, the transmission antenna 327 may be provided at an outer portion of the touch device, and the reception antenna 335 may be formed at an inner portion of the touch device.

Meanwhile, the reception device 339 may include a low noise amplifier (LAN) or an analog-to-digital converter (ADC). The LAN low-noise amplifies the radar signal. The ADC converts the radar signal from an analogue signal to digital data to generate reception data. In this case, each reception device 339 may be inserted into the groove of the substrate 301.

Meanwhile, referring to FIG. 3, the touch device may further include a case 400 to support the display 200. The case 400 may protect the display 200. In this case, the radar system 300 may be provided under the case 400. In other words, the radar system 300 may be provided on the rear surface of the case 400.

According to the embodiment, since the touch is recognized by the radar system 300, the touch device is not affected by external electrical noise. In other words, according to the embodiment, since the touch is recognized through a scheme different from a scheme of recognizing a touch using an electrical field based on a capacitive touch scheme, the touch device is not affected by the electrical field.

The radar system 300 can variously recognize the touch. The radar system 300 may recognize at various angles.

For example, referring to FIGS. 4 and 5, the radar system 300 may sense a touch made in a 3D space. In other words, the radar system 300 may sense the touch even if an input device does not directly touch the top surface of the display 200. In this case, the radar system 300 may recognize the distance (in a Z axis) between the touch device and a touch point T. The radar system 300 may recognize the touch of a point within a distance of 4 mm to 1 m from the top surface of the touch device. In addition, the radar system 300 may recognize coordinates (x, y) of a point T' obtained by projecting the touch point T on the top surface of the touch device.

Meanwhile, the radar system 300 may recognize a gesture or a motion. For example, referring to FIG. 6, the radar system 300 may recognize a gesture or a motion of turning over a page of a book. The embodiment is not limited thereto, but the radar system 300 may recognize various gestures or various motions.

In addition, the radar system 300 may recognize a 3D shape of an object making a touch. For example, referring to FIG. 7, the radar system 300 may recognize a shape derived from the shape of the object making a touch.

Meanwhile, the radar system 300 may recognize a velocity of an object making a touch. In other words, as shown in FIG. 8, when the input device repeatedly makes a touch, the radar system 300 may recognize the velocity of the touch. In addition, the radar system 300 may have a high speed sensing function.

Various shapes of touches can be recognized by the radar system 300. Accordingly, a differentiated user interface can be provided, and the user experience can be expanded.

Hereinafter, a touch device according to still another embodiment will be described with reference to FIGS. 19 and 23. In the following description, the details of the structure and the components the same as those of the above-described embodiment will be omitted.

Referring to FIG. 9, the touch device according to still another embodiment may include a cover 100, a display 200, and a radar system 300.

The display 200 may have a first area 1A to display a screen image and a second area 2A adjacent to the first area 1A. The second area 2A may surround an edge of the first area 1A.

The radar system 300 may be provided in the second area 2A. The radar system 300 may be provided to the extent that the screen image of the display 200 is not interrupted. The radar system 300 may recognize the touch of the touch device. The radar system 300 may sense the touch of the touch device using an electromagnetic wave. In this case, the radar system 300 transmits a radar signal in the form of an electromagnetic wave. In this case, the radar signal is reflected from an input device or an object touched on the touch device and introduced into the touch device.

The radar system 300 includes a radar transmission unit 310 and a radar reception unit 320. The radar system 300 may be realized as shown in FIGS. 10 to 12.

The radar transmission unit 310 transmits a radar signal in the radar system 300. In this case, the radar transmission unit 310 transmits the radar signal through one transmission channel. In addition, the radar transmission unit 310 periodically transmits the radar signal. The radar transmission unit 310 includes a transmission device 325 and a transmission antenna 327.

In this case, the radar transmission unit 310 may transmit the radar signal (St) at a frequency band in the range of 1 GHz to 15 GHz. Accordingly, the touch device can recognize not only a direct touch on the top surface of the touch device, but also a space touch at a predetermined distance from the touch device.

The transmission device 325 generates a radar signal from transmission data. In this case, the transmission device 325 generates a radar signal corresponding to the transmission channel. The transmission device 325 includes an oscillation unit. For example, the oscillation unit includes a voltage controlled oscillator (VCO).

The transmission antenna 327 transmits the radar signal (S) to the top surface of the display 200. The transmission antenna 327 transmits the radar signal (S) to the top surface of the touch device. The radar signal (S) may be transmitted from one end of the display 200 to an opposite end of the display 200. The radar signal (S) may be transmitted horizontally to the top surface of the display 200.

In this case, the transmission antenna 327 transmits the radar signal through the transmission channel. The transmission antenna 327 may have a radiation pattern. The transmission antenna 327 includes a feeding unit 328 and a plurality of radiators 329. The feeding unit 328 is connected to the transmission device 325. In addition, the feeding unit 328 transmits the radar signal to the radiators 329. The radiators 329 are distributed and arranged in the feeding unit 328. In addition, the radiators 329 actually transmit the radar signal.

The radar reception unit 320 receives a radar signal in the radar system 300. In this case, the radar reception unit 320 receives the radar signal through a plurality of reception channels. The radar reception unit 320 includes a plurality of reception antennas 335 and a plurality of reception devices 339. In this case, the reception channels are allocated to the reception antennas 335, respectively, and the reception antennas 335 individually correspond to the reception devices 339, respectively.

The reception antennas 335 receive the radar signal from the upper portion of the display 200. The reception antennas 335 receive the radar signal from the top surface of the touch device. When the touch T is made on the touch device, the reception antennas 335 receive the signal reflected by the touch. In this case, the reception antennas 335 receive the radar signal through the reception channels. In other words, the reception antennas 335 receive the radar signal through the reception channels, respectively. In addition, the reception antennas 335 transmit the radar signal to the reception devices 339.

The reception antenna 335 may have a radiation pattern. Each of the reception antennas 335 includes a feeding unit 336 and a plurality of radiators 337. The feeding unit 336 is connected with the relevant reception device 339. The radiators 337 are distributed and arranged in the feeding unit 336. In addition, the radiators 337 actually receive the radar signal. Thereafter, the radiators 337 transmit the radar signal to the feeding unit 336.

The relevant reception devices 339 generate reception data from the radar signal (Sr). In this case, the reception devices 339 generate reception data corresponding to the reception channels. In other words, the reception devices 339 generate the reception data corresponding to the reception channels, respectively. The touch of the touch device can be recognized by analyzing the reception data.

Meanwhile, the number of radar reception units 321, 322, and 323 may be larger than the number of radar transmission units 310. In detail, the number of the reception antennas 335 may be larger than the number of transmission antennas 327. Accordingly, the reflected signal can be accurately recognized with respect to various types of touches. In other words, the distance between the touch device and a touch point and a position related to the coordinates of the touch point can be recognized from the reflected signal by the touch and the reception data. In addition, when the touch is made in the form of a gesture or a motion, the touch device can recognize the touch. In addition, the touch device can recognize a 3D shape of an object making the touch.

Meanwhile, the reception device 339 may include an LAN or an ADC. The LAN low-noise amplifies the radar signal. The ADC converts the radar signal from an analogue signal to digital data to generate reception data.

Meanwhile, referring to FIGS. 14 and 15, the radar transmission unit 310 and the radar reception unit 320 include various types of radar transmission units and various types of radar reception units. In other words, the transmission antenna 327 and the reception antenna 335 may have a spiral pattern shape or a flat curved shape.

Meanwhile, referring to FIG. 16, the radar system 300 may be provided on the top surface of the cover 100. The radar system 300 may be provided in the second area 2A.

Meanwhile, referring to FIG. 17, the touch device may further include a case 400 to support the display 200. The case 400 may protect the display 200. In this case, the radar system 300 may be provided on the case 400. In other words, the radar system 300 may be provided on the top surface surface of the case 400. However, the embodiment is not limited thereto, but the radar system 300 may be provided on a bottom surface of the case 400.

According to the embodiment, since the touch is recognized by the radar system 300, the touch device is not affected by external electrical noise. In other words, according to the embodiment, since the touch is recognized through a scheme different from a scheme of recognizing a touch using an electrical field based on a capacitive touch scheme, the touch device is not affected by the electrical field.

The radar system 300 can variously recognize the touch. The radar system 300 may recognize at various angles.

For example, referring to FIGS. 18 and 19, the radar system 300 may sense a touch made in a 3D space. In other words, the radar system 300 may sense the touch even if an input device does not directly touch the top surface of the display 200. In this case, the radar system 300 may recognize the distance (in a Z axis) between the touch device and a touch point T. The radar system 300 may recognize the touch of a point within a distance of 4 mm to 1 m from the top surface of the touch device. In addition, the radar system 300 may recognize coordinates (x, y) of a touch point T' obtained by projecting the touch point T on the top surface of the touch device.

Meanwhile, the radar system 300 may recognize a gesture or a motion. For example, referring to FIG. 20, the radar system 300 may recognize a gesture or a motion of turning over a page of a book. The embodiment is not limited thereto, but the radar system 300 may recognize various gestures or various motions.

In addition, the radar system 300 may recognize a 3D shape of an object making a touch. For example, referring to FIG. 21, the radar system 300 may recognize a shape derived from the shape of the object making a touch.

Meanwhile, the radar system 300 may recognize a velocity of an object making a touch. In other words, as shown in FIG. 22, when the input device repeatedly makes a touch, the radar system 300 may recognize the velocity of the touch. In addition, the radar system 300 may have a high speed sensing function.

Various shapes of touches can be recognized by the radar system 300. Accordingly, a differentiated user interface can be provided, and the user experience can be expanded.

Meanwhile, the touch device according to the above embodiments is applicable to a wearable device, which can be directly worn by a user, as well as electronic products such as a mobile terminal or a navigation system.

In particular, the touch device according to the embodiments is applicable to a wearable device, such as a smart watch or smart glass, which may be directly worn by the user. In addition, the touch device according to the embodiments is applicable to a wearable device, such as clothes, gloves, shoes, or a cap, which may be worn by the user.

Hereinafter, a wearable device according to the embodiments employing the touch device according to the embodiment will be described with reference to FIGS. 23 to 27.

Referring to FIG. 23, the wearable device according to the embodiment may include a first area 1A and a second area 2A.

A screen image may be displayed in the first area 1A. The first 1A may include the display 100. The display 100 has a display area to output an image.

Information of a predetermined object may be displayed in the first area 1A. In detail, in the first area 1A, position information calculated based on coordinates of the object and velocity information calculated based on a velocity value and a direction value of the object may be displayed. In addition, the moving path of the object embodied by calculating the position information and the velocity information can be displayed.

The second area 2A may be provided adjacent to the first area 1A. The second area 2A may include the radar system 300. In other words, the radar system 300 may be provided in the second area 2A. The radar system 300 performs a function of detecting surroundings. The radar system 300 may detect surroundings using an electronic magnetic wave. In this case, the radar system 300 transmits a radar signal in the form of an electromagnetic wave. In this case, the radar signal is reflected from an input device or an object and introduced into the wearable device.

In detail, referring to FIGS. 24 and 25, the radar system 300 includes the radar transmission unit 310 and the radar reception unit 320. The radar system 300 may be realized as shown in FIG. 2.

The radar transmission unit 310 transmits a radar signal in the radar system 300. In this case, the radar transmission unit 310 transmits the radar signal (St) through one transmission channel. In addition, the radar transmission unit 310 periodically transmits the radar signal. The radar transmission unit 310 includes the transmission device 325 and the transmission antenna 327.

In this case, the radar transmission unit 310 can recognize an object positioned in a space at a predetermined distance from the wearable device.

The transmission device 325 generates a radar signal from transmission data. In this case, the transmission device 325 generates a radar signal corresponding to the transmission channel. The transmission device 325 includes an oscillation unit. For example, the oscillation unit includes a voltage controlled oscillator (VCO) or an oscillator.

The transmission antenna 327 transmits the radar signal into the air. The transmission antenna 327 transmits the radar signal to the outside of the wearable device. In this case, the transmission antenna 327 transmits the radar signal through the transmission channel. The transmission antenna 327 includes the feeding unit 328 and the radiators 329. The feeding unit 328 is connected to the transmission device 325. In addition, the feeding unit 328 transmits the radar signal to the radiators 329. The radiators 329 are distributed and arranged in the feeding unit 328. In addition, the radiators 329 actually transmit the radar signal.

The radar reception unit 320 receives a radar signal in the radar system 300. In this case, the radar reception unit 320 receives the radar signal through a plurality of reception channels. The radar reception unit 320 includes a plurality of reception antennas 335 and a plurality of reception devices 339. In this case, the reception channels are allocated to the reception antennas 335, respectively, and the reception antennas 335 individually correspond to the reception devices 339, respectively.

The reception antennas 335 receive a radar signal from the air. The reception antennas 335 receive the radar signal from the outside of the wearable device. The reception antennas 335 receive the signal reflected by an object. In this case, the reception antennas 335 receive the radar signal through the reception channels. In other words, the reception antennas 335 receive the radar signal through the reception channels, respectively. In addition, the reception antennas 335 transmit the radar signal to the reception devices 339. Each of the reception antennas 335 includes the feeding unit 336 and the radiators 337. The feeding unit 336 is connected with the relevant reception device 339. The radiators 337 are distributed and arranged in the feeding unit 336. In addition, the radiators 337 actually receive the radar signal. Thereafter, the radiators 337 transmit the radar signal to the feeding unit 336.

The relevant reception devices 339 generate reception data from the radar signal. In this case, the reception devices 339 generate reception data corresponding to the reception channels. In other words, the reception devices 339 generate the reception data corresponding to the reception channels, respectively. The object can be recognized by analyzing the reception data.

The number of the radar reception units 320 may be larger than the number of radar transmission units 310. In detail, the number of the reception antennas 335 may be larger than the number of transmission antennas 327. Accordingly, the reflected signal for various types of touches can be accurately recognized. In other words, the distance between the wearable device and the object and a position of the object related to the coordinates of the object can be recognized from the reflected signal by the object and the reception data. In addition, the wearable device can recognize a 3D shape of the object. In addition, the wearable device can recognize the velocity of the object.

Meanwhile, the reception device 339 may include an LAN or an ADC. The LAN low-noise amplifies the radar signal. The ADC converts the radar signal from an analogue signal to digital data to generate reception data.

Thereafter, a data processing unit 600 may process the reception data. The data processing unit 600 may generate data based on image information, position information, and moving velocity information of the object which are detected from the reflected signal as the radar signal is continuously checked.

In addition, the data processing unit 600 processes the reception data to provide information to the first area 1A. In other words, the data processing unit 600 processes the reception data to transmit the information to the display 100. In this case, the display 100 can embody the object based on the data, and can track the moving path of the embodied object. Accordingly, the first area 1A of the wearable device may monitor the information of an external object.

In addition, the data processing unit 600 may process the reception data in the form of voice data. Accordingly, the data processing unit 600 converts the reception data into the voice data to be provided for a user. Accordingly, the wearable device according to the embodiment may be used for the blind.

Meanwhile, according to the embodiment, a project module 500 may be further provided. The wearable device according to the embodiment may realize an augmented reality through the project module 500. In particular, according to the embodiment, a camera used to realize the augmented reality may be omitted. According to the related art, a project module and a camera must be provided in order to realize the augmented reality. In other words, according to the related art, the augmented reality is realized by using an image signal obtained by the camera and the project module using the image signal. However, according to the embodiment, the augmented reality can be realized through the radar system 300 instead of the camera. In other words, according to the embodiment, after creating an image signal for the augmented reality using the reflected signal of the radar system 300, the image signal is applied to the project module 500 to realize the augmented reality. Accordingly, the weight and the volume of the wearable device can be reduced, so that various types of wearable devices can be employed.

Referring to FIG. 23, the wearable device according to the embodiment can be worn. For example, the wearable device according to the embodiment may include wearable smart glasses. In this case, the first area 1A may correspond to a lens, and the second area 2A may correspond to the frame of the glasses. The radar system 300 may be provided in the frame of the glasses to detect the object. Meanwhile, although the drawings show that the radar system 300 is provided in the frame of the glasses, the embodiment is not limited thereto. Accordingly, the radar system 300 may be provided at various peripheral portions, such as a bridge, a ring, or a top bar, in smart glasses.

Meanwhile, referring to FIG. 26, the wearable device according to another embodiment may be a wearable smart watch. In this case, the first area 1A may be a screen to display information. The second area 2A may be a band wearable on a wrist. The display 100 may be provided in the first area 1A, and the radar system 300 may be provided in the second area 2A.

However, the embodiment is not limited thereto. The wearable device according to the embodiment may be applied to various articles, such as clothes, gloves, shoes, or a cap, that may be worn by the user.

Meanwhile, referring to FIG. 27, a wearable device according to another embodiment may include a radar system 300 and a project module 500 described above. In other words, the wearable device according to another embodiment may not include an additional display.

As shown in FIG. 27, the wearable device according to another embodiment may be a wearable cap. Accordingly, as a user directly wears the wearable cap to realize augmented reality. Therefore, the differentiated user interface can be provided, and the user experience can be expanded.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The embodiment can provide a touch device having a novel structure, and the touch device is applicable to a wearable device, which can be directly worn by a user, as well as an electronic product such as a mobile terminal or a navigation.

The invention claimed is:

1. A wearable device comprising:
   a first area to display a screen image; and
   a second area adjacent to the first area,
   wherein the second area comprises a radar system comprising:
   a first substrate portion provided on a first side of the first area,
   a second substrate portion that is separated away from the first substrate portion and is provided on a second side of the first area such that the first area is between the first substrate portion and the second substrate portion,
   a transmission unit, on the first substrate portion, to transmit a signal from transmission data, and
   a reception unit, on the second substrate portion, to receive the signal,
   the transmission unit on the first substrate portion comprises:
   a transmission device, on the first substrate portion, to generate a radar signal, and
   a transmission antenna, on the first substrate portion, to receive the radar signal from the transmission device and to transmit the radar signal, wherein the transmission antenna includes at least one first feeding unit on the first substrate portion to receive the radar signal from the transmission device, and a plurality of radiators, on the first substrate portion, coupled to the at least one first feeding unit, and
   the reception unit on the second substrate portion comprises:
   a reception antenna, on the second substrate portion, to receive the radar signal, and
   a reception device, on the second substrate portion, to receive the radar signal from the reception antenna, and the reception device to generate reception data based on the received radar signal,
   wherein the reception antenna includes at least one second feeding unit on the second substrate portion, and a plurality of radiators, on the second substrate portion, coupled to the at least one second feeding unit, wherein the at least one second feeding unit is coupled to the reception device on the second substrate portion,
   wherein the radar system is vertically overlapped with the first area,
   wherein a touch sensing of the first and second areas is detected by the radar system.

2. The wearable device of claim 1, wherein a total number of reception units is greater than a total number of transmission units.

3. The wearable device of claim 1, wherein the transmission unit transmits the radar signal at a frequency band in a range of 1 GHz to 15 GHz.

4. The wearable device of claim 1, wherein the first substrate portion is part of a single substrate, and the second substrate portion is part of the single substrate.

5. The wearable device of claim 1, wherein the first substrate portion is separate from the second substrate portion.

6. The wearable device of claim 1, wherein the transmission device includes a voltage controlled oscillator on the first substrate portion.

7. The wearable device of claim 1, wherein the reception device includes a low noise amplifier, on the second substrate portion, to amplify the received radar signal.

8. The wearable device of claim 1, wherein the reception device includes an analog-to-digital converter to convert the radar signal from analog data to digital data to generate the reception data.

* * * * *